United States Patent [19]

Bone

[11] Patent Number: 4,693,009
[45] Date of Patent: Sep. 15, 1987

[54] SCROLLER JIG SAW

[75] Inventor: Daniel Bone, Langley Moor, England

[73] Assignee: Black & Decker Inc., Newark, Del.

[21] Appl. No.: 732,419

[22] Filed: May 9, 1985

[30] Foreign Application Priority Data

May 11, 1984 [GB] United Kingdom ............... 8412057

[51] Int. Cl.⁴ .................................................. B27B 19/09
[52] U.S. Cl. ........................................... 30/392; 83/747
[58] Field of Search ................ 30/392, 393; 83/785, 83/747, 776

[56] References Cited

U.S. PATENT DOCUMENTS

| | | |
|---|---|---|
| 3,494,390 | 2/1970 | Dudek . |
| 3,542,097 | 11/1974 | Dudek ................................ 30/392 |
| 3,547,166 | 12/1970 | Dudek ............................ 30/392 X |
| 3,665,983 | 5/1972 | Wagner ................................ 143/68 |
| 3,729,822 | 5/1973 | Batson . |
| 3,795,980 | 3/1974 | Batson .............................. 83/747 X |
| 4,021,914 | 5/1977 | Leibundgut et al. .................. 30/392 |
| 4,283,855 | 8/1981 | Nalley . |
| 4,545,123 | 10/1985 | Hartmann ............................ 30/393 |

FOREIGN PATENT DOCUMENTS

| | | |
|---|---|---|
| 965334 | 4/1978 | Canada ................................... 30/392 |
| 0124198 | 7/1984 | European Pat. Off. . |
| 2053795 | 2/1981 | United Kingdom . |

Primary Examiner—E. R. Kazenske
Assistant Examiner—Willmon Fridie, Jr.
Attorney, Agent, or Firm—Edward D. Murphy; Harold Weinstein; Edward D. C. Bartlett

[57] ABSTRACT

A scroller jig saw has a pivoted locking lever spring biased into engagement with a rotatable scrolling control assembly to lock the latter, and therewith the saw blade, against rotation. A cam, preferably rotatably mounted on the scrolling control assembly, is manually movable between a scrolling position in which it holds the locking lever out of engagement with the scrolling control assembly and a non-scrolling position in which the lever is free to be spring biased into locking engagement with the scrolling control assembly.

14 Claims, 10 Drawing Figures

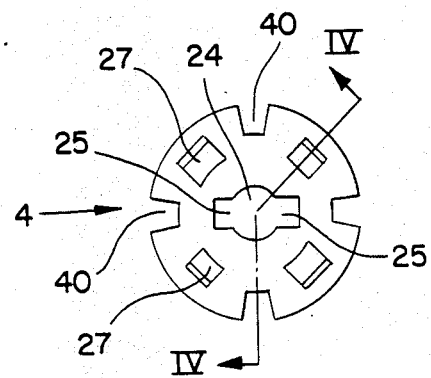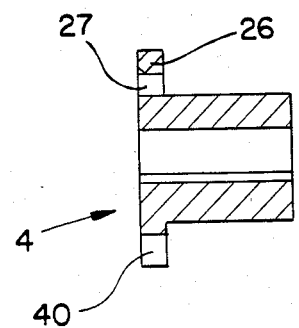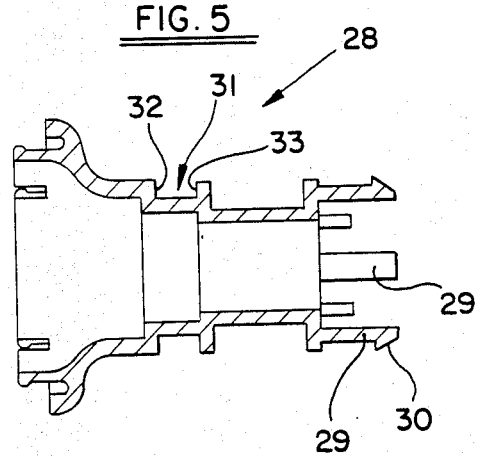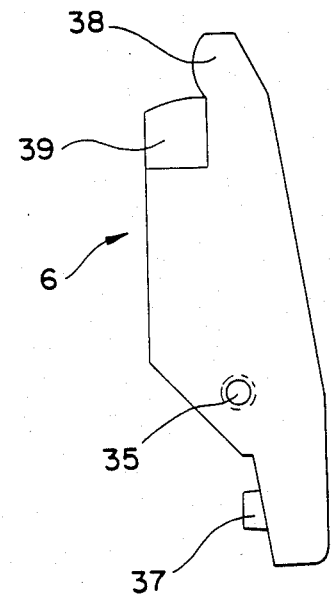

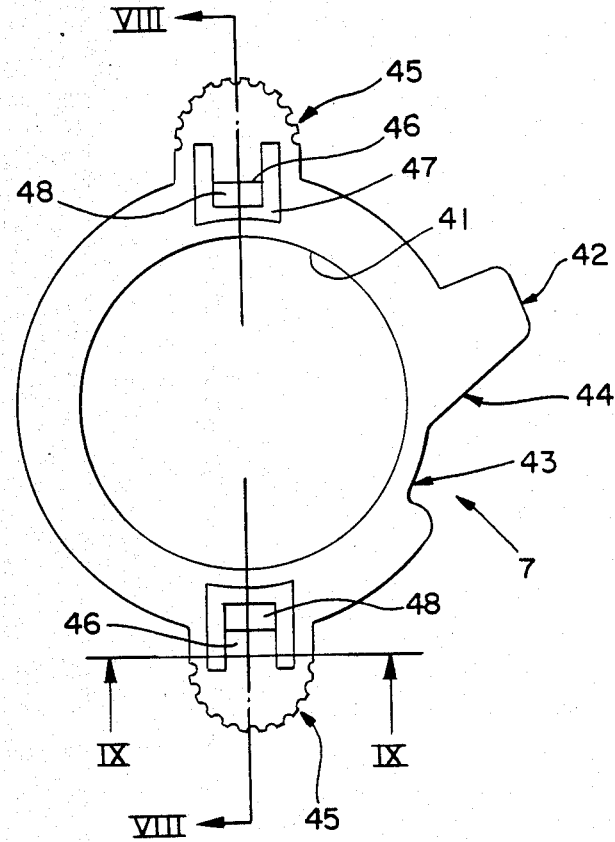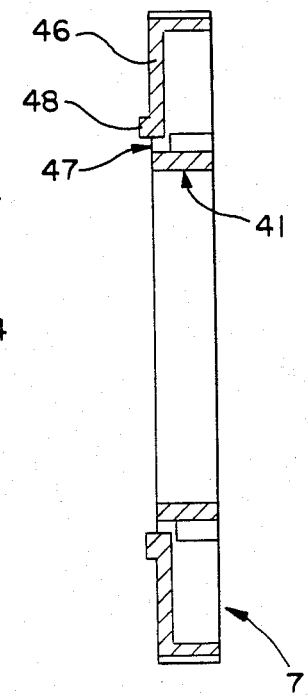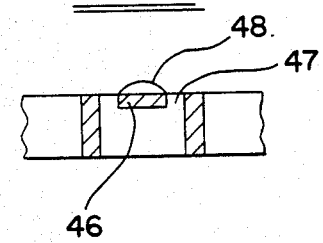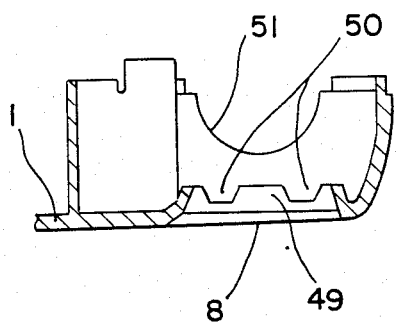

SCROLLER JIG SAW

FIELD OF THE INVENTION

This invention relates to jig saws and more particularly scroller jig saws, namely jig saws in which the reciprocating saw blade may be rotated about the axis of reciprocation of the saw blade.

BACKGROUND OF THE INVENTION

It is desirable for a scroller jig saw to be able to operate in both a scrolling and a non-scrolling mode. In the scrolling mode the operator needs to be able to control rotation of the saw blade about its longitudinal axis, while in the non-scrolling mode the saw blade needs to be locked against such rotation. It is important that the saw blade can be locked in the conventional position, namely with the cutting edge of the saw blade facing directly forwards, but it is also desirable that the saw blade should be lockable in other angular positions.

A variety of mechanisms for achieving the controls mentioned above have been proposed, and examples of such mechanisms are to be found in U.S. Pat. Nos. 3,494,390; 3,729,822; and 4,283,855. While various mechanisms have been proposed, there is still a need for a simple and reliable mechanism which facilitates switching between scrolling and non-scrolling modes.

SUMMARY OF THE INVENTION

It is an object of the invention to provide a scroller jig saw having an improved mechanism for locking the saw blade against rotation and for releasing the saw blade for rotation.

A feature by which this object is achieved is the provision of a pivoted lever which is spring biased to lock rotation of the saw blade in a non-scrolling position of a locking control member and to pivot the lever to an inoperative position in a scrolling position of the control member. This has the advantages of simplicity of construction and facilitating operation of the jig saw by an operator.

Accordingly, therefore, there is provided by the present invention a scroller jig saw having a housing, a saw blade drive shaft mounted for reciprocating movement relative to the housing along a longitudinal axis and for rotation about said axis, a motor drivingly connected to said drive shaft for reciprocating said drive shaft along said axis, a scrolling control member accessible to an operator and coupled to said drive shaft for rotation thereof, locking means for releasably locking said drive shaft against rotation, said locking means comprising a pivotally mounted lever pivotal between a locking position in which said drive shaft is locked against rotation and a free position in which said drive shaft is free to rotate, said lever being resiliently biased towards said locking position, and a locking control member accessible to the operator and movable between a scrolling position in which said lever is held in said free position and a non-scrolling position in which said lever is free to be biased into said locking position.

The locking control member preferably comprises a rotatable cam member mounted for rotation about the axis of the saw blade shaft and including a cam surface engageable with the locking lever.

The locking control member may advantageously include at least one lug projecting through the housing. The lug preferably projects through a side of the housing adjacent the scrolling control member.

The saw blade drive shaft may be mounted in a scrolling control assembly, including the scrolling control member, for reciprocation relative thereto but rotatably coupled thereto. The scrolling control assembly may be mounted for rotation about the axis of the saw blade drive shaft. The locking control member is preferably mounted on the scrolling control assembly.

In one embodiment of the invention the locking lever is pivotally mounted intermediate its ends, is resiliently biased by a compression spring at one end, is engageable with the locking control member at the other end, and is engageable with a member rotatably coupled to the saw blade drive shaft between the other end and the pivotal mounting of the locking lever.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 3 is a top end view of a control block forming a part of a scrolling control assembly for the jig saw of FIGS. 1 and 2;

FIG. 4 is a sectional view along the lines IV—IV of FIG. 3;

FIG. 5 is a sectional view of another part of the scrolling control assembly of the jig saw, this part being turned anticlockwise through a right angle from its orientation in FIG. 2;

FIG. 6 is a side view of a locking lever forming a part of a releasable locking means for the scrolling mechanism of the jig saw, the lever being shown from the opposite side from its orientation in FIG. 2;

FIG. 7 is a top plan view of a cam forming another part of the releasable locking means of the jig saw;

FIG. 8 is a sectional view along the line VIII—VIII of FIG. 7;

FIG. 9 is a sectional view along the lines IX—IX of FIG. 7; and

FIG. 10 is a diagrammatic sectional representation along the line X—X of FIG. 1 of a part of the housing only.

DETAILED DESCRIPTION OF THE PREFERRED EMBODIMENT

Figure 1:
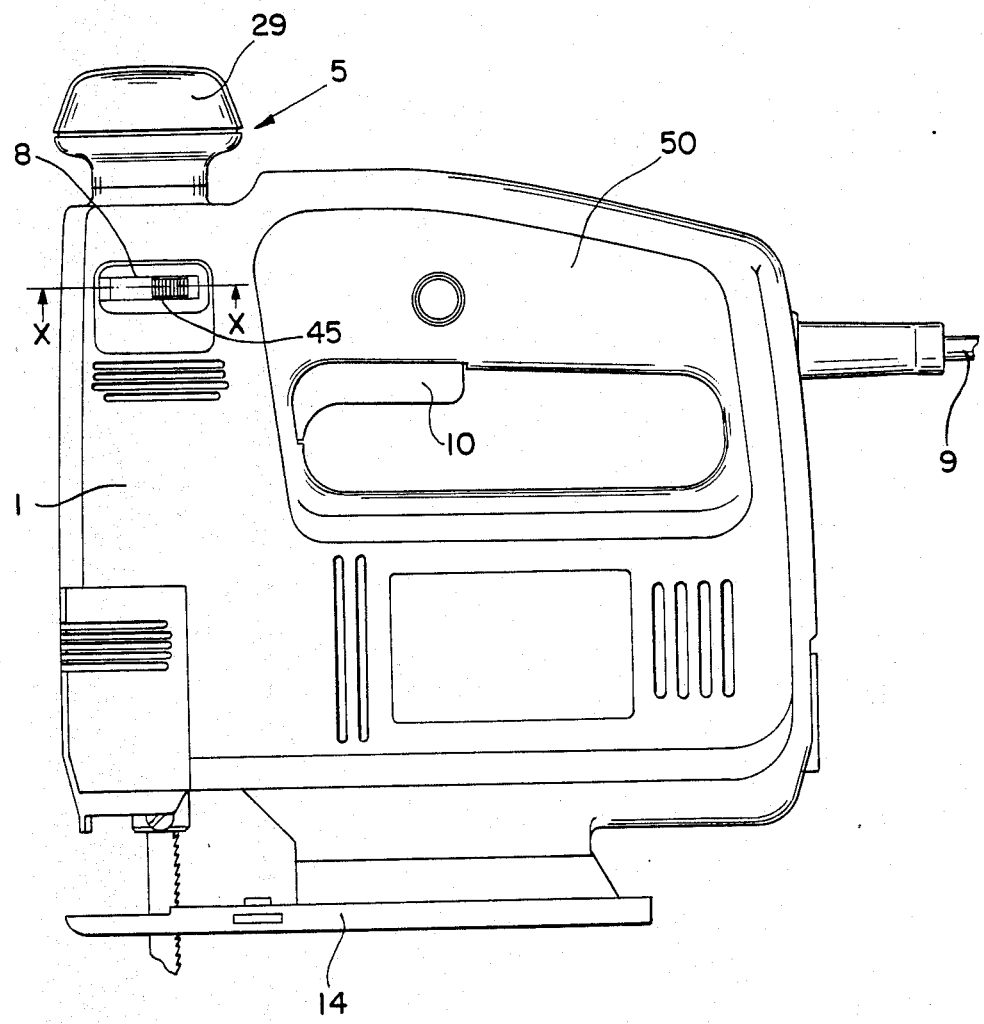
FIG. 1 is a side elevational view of a scroller jig saw embodying the invention.
Figure 2:
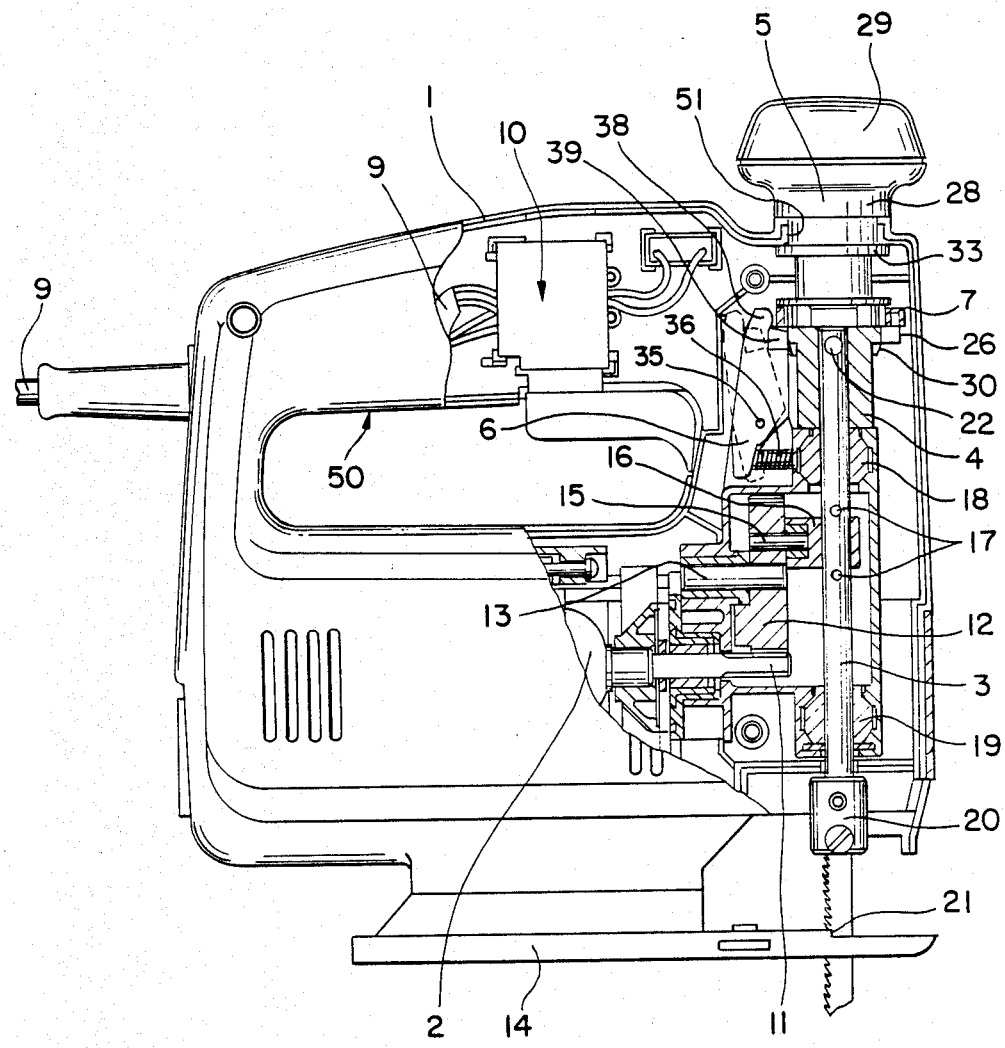
FIG. 2 is a side view of the jig saw from the opposite side to FIG. 1 partly broken away to show internal components and partly sectioned.

Referring first to FIGS. 1 and 2, the scroller jig saw shown in the drawings includes a housing 1 of clam shell construction on the bottom of which a shoe 14 is mounted. The housing 1 is formed with a handle 50. Received in the housing 1 are, inter alia, an electric motor 2, a saw blade drive shaft 3 arranged to be reciprocated by the motor as will be described in more detail later, a scrolling control assembly including a control block 4 and a control knob 5 projecting externally of the casing, and a releasable locking means for locking the scrolling control assembly. The releasable locking means consists of a spring biased locking lever 6, and a cam 7 rotatably mounted on the scrolling control assembly and accessible to an operator by virtue of openings 8 on opposite sides of the housing 1 below but adjacent the knob 5.

Power is supplied to the motor 2 through a cable 9 via a trigger switch 10. The motor 2 has an armature shaft which carries a pinion 11 on its end, the pinion 11 meshing with a gear 12 fixed to a rotatably mounted spindle 13. The gear 12 carries an eccentric pin 15 which is slideably mounted in a horizontal track of a yoke 16 having a central bore in which the saw blade drive shaft 3, which is of circular cross-section, is received. Longitudinal relative movement of the shaft 3 relative to the yoke 16 is prevented by pins 17 which pass through the shaft 3 and project therefrom on either side of the yoke 16.

The shaft is mounted for reciprocating and rotational movement in upper and lower space apart bearings 18, 19, and its lower end carries a saw blade holder 20 in which a saw blade 21 (not shown in FIG. 1) is mounted and replaceably secured therein. Adjacent the top end of the shaft 3 a transverse pin 22 passes through the shaft and projects a short distance out of the shaft on each side. The upper end of the shaft 3 is slidably received in a non-circular bore of the control block 4.

Referring also to FIGS. 3 and 4, it will be seen that the control block 4 has a bore with a central circular portion 24 and diametrically opposite extensions 25 in which the ends of the pin 22 are received. Thus the shaft 3 is able to reciprocate longitudinally relative to the block 4 but is locked against rotation relative to the block.

The block 4 carries a peripheral flange 26 at its upper end and this flange is provided with four apertures 27 equispaced around the flange and also with four notches 40 in its periphery equispaced between the apertures 27. The manually graspable control knob 5 is formed in two parts, namely a lower main part 28, which extends downwardly through the top of the housing 1, and an upper cap part 29 which is snap fitted onto the part 28. The lower part 28 is shown in FIG. 5 and at its bottom end carries four legs 29 which extend downwardly parallel to the axis of rotation of the drive shaft 3 and which snap fit into the apertures 27 in the block 4. The legs 29 carry feet 30 which project on the lower side of the flange 26 and retain the control knob on the control block (see FIG. 2). Intermediate the ends of the part 28 a cylindrical bearing portion 31, defined between opposing shoulders 32 and 33, is provided. The bearing portion 31 mounts the control knob 5 in a correspondingly sized opening 51 in the top of the housing 1 for rotation about its longitudinal axis, which is also the longitudinal axis of the shaft 3.

The locking lever 6, shown in FIGS. 2 and 6 is pivotally mounted on a pivot 35 and is biased by a compression spring 36 compressed between the lower end of the lever 6 and an internal part of the housing 1 in which the upper bearing 18 is supported. A boss 37 (see FIG. 6) formed on the lower end of the lever 6 locates the spring relative to the lever. At its top end the lever 6 has a curved nose 38 which is engageable with the cam 7 as will be described below. Immediately below the nose 38 is a latch part 39, and the cross-section of this part is arranged to match the cross-section of each of the notches 40 in the flange 26 so that the latch part 39 is selectively engageable with each of the notches. In FIG. 2 the lever 6 is shown in solid outline in the locking position to which it is biased by the spring 36; in this locking position the latch part 39 is engaged with a selected notch 40 on the control block 4.

The ring-shaped cam 7 shown in FIGS. 7 to 9 has a central bore 41 through which the lower part 28 of the control knobs extends and which receives the upper parts of the legs 29. The cam 7 is thus rotatably mounted on the scroller control assembly. A pair of radially extending serrated lugs 45 are formed on diametrically opposite parts of the cam 7 and extend through the openings 8 in the housing 1. On the side of the cam facing the locking lever 6, the peripheral surface of the cam 7 is shaped to define a raised face 42, a recessed face 43 and an interconnecting sloping face 44, these parts together defining a cam surface.

Formed in the top surface of the cam 7 at the location of each of the lugs 45 is a resilient tongue 46, disconnected from the rest of the cam 7 on three sides by a slot 47, and carrying a pip 48 protruding above the general top surface of the cam. Referring now also to FIG. 10, it will be seen that, immediately inside each of the housing side openings 8 and along the top of that opening, an upper wall 49 is provided with a pair of recesses 50 formed therein. The cam 7 is so positioned relative to the housing 1 that the general surface of the top of the cam 7 is immediately adjacent the wall 49 and, with the lug 45 projecting centrally through the respective opening 8, the pip 48 is pressed downwardly into the body of the cam. If the manually operable lug 45 is moved to one end or the other of the slot-like opening 8, however, the pip 49 moves into a recess 50 so releasably securing the cam 7 in either a scrolling or non-scrolling position. Substantial movement of the cam further to one side is prevented by engagement of the lugs 45 with the sides of the openings 8. The two positions of the cam 7 in which the pips 48 are received in the recesses 50 define the two working positions of the cam and it will be appreciated that the cam "clicks" into both these positions. In one of these positions (the non-scrolling position) which is shown in FIG. 2, the recessed face 43 of the cam 7 is aligned with the nose 38 of the locking lever 6 and the locking lever is free to be spring biased into the locking position shown in solid outline in FIG. 2. When the cam 7 is rotated to the other position (the scrolling position), however, the nose 38 comes into camming engagement first with the sloping face 44 of the cam and then with the raised face 42 and the locking lever 6 is moved to the "free position" shown in dotted outline in FIG. 2, in which the latch part 39 of the lever is disengaged and spaced from the control block 4 and the scrolling control assembly 4, 5 is therefore able to rotate.

If an operator actuates the trigger switch 10 with the parts in the position shown in FIG. 2, then the saw operates as follows. The pinion 11 is driven by the motor 2 and in turn rotates the gear 12. Rotation of the gear 12 causes orbital movement of the pin 15; the horizontal component of this orbital movement is accommodated by the pin sliding in the yoke 16 while the vertical component is translated into reciprocating movement of the shaft 3 in the bearings 18, 19 and reciprocating movement of the saw blade 21. While the saw blade is rotatably mounted via its drive shaft 3 in the bearings 18, 19, it is rotatably locked relative to the control block 4 and this in turn is locked against rotation by the engagement of the latch part 39 of the lever 6 in one of the notches 40 of the control block 4. Thus the saw blade 21 is locked in the angular position shown in FIG. 2 and will not rotate even if a user attempts to rotate the control knob 5 (which is now also locked against rotation). In this non-scrolling mode the saw operates as a conventional jig saw.

If now an operator "clicks" the cam 7 over to its other working position by gripping the serrated free ends of the lugs 45 projecting through the openings 8, the top end of the locking lever 6 is cammed outwardly against the bias of the spring 36 and the latch part 39 is withdrawn from the respective notch 40. The control block 4 is then free to rotate and therefore the shaft 3 and saw blade 21 are also free to rotate. The operator can now manually control rotation of these parts by means of the control knob 5 on the top of the tool housing. This is the scrolling mode of the tool.

If an operator wishes to revert to a non-scrolling mode, he first rotates the control knob 5 until the saw blade 21 is in approximately the correct orientation, and then "clicks" the cam 7 back to the non-scrolling position shown in FIG. 2. Provided one of the notches 40 is approximately aligned with the locking lever 6, the lever will also revert to the position shown in FIG. 2 and, as it enters the notch 40 which, as can be seen in FIG. 3, is slightly tapered, the control block 4 will be rotated slightly to bring it into exact alignment with the latch part 39, which is correspondingly tapered.

If none of the notches 40 are approximately aligned with the lever 6, the latch part 39 of the lever 6 will be biased into contact with the periphery of the control block 4, and the saw will remain in the scrolling mode until the scroller control assembly is rotated sufficiently to bring one of the notches 40 into approximate alignment with the lever 6. It will be appreciated that the four notches 40 on the control block 4 provide four orientations, spaced 90° apart from one another, in which the saw blade can be locked.

The above described embodiments, of course, are not to be construed as limiting the breadth of the present invention. Modifications, and other alternative constructions, will be apparent which are within the spirit and scope of the invention as defined in the appended claims.

What is claimed is:

1. A scroller jig saw, comprising:
   a housing;
   a saw blade drive shaft mounted for reciprocating movement relative to said housing along a longitudinal axis and for rotation about said axis;
   a motor mounted in said housing and drivingly connected to said drive shaft for reciprocating said drive shaft along said axis;
   a scrolling control member accessible to an operator and coupled to said drive shaft for rotation thereof;
   locking means for releasably locking said drive shaft against rotation;
   said locking means comprising a pivotally mounted lever pivotal between a locking position in which said drive shaft is locked against rotation and a free position in which said drive shaft is free to rotate;
   said lever being resiliently biased towards said locking position;
   a locking control member accessible to the operator and movable between a scrolling position, in which said locking control member acts upon said lever to hold the latter in said free position, and a non-scrolling position in which said control member allows said lever to be biased into said locking position; and
   said locking control member having two manually operable lugs projecting outwardly through openings in opposite sides of said housing at locations adjacent said scrolling control member.

2. The scroller jig saw of claim 1, comprising a scrolling control assembly which includes and is rotatable by said scrolling control member, and further includes a part in which said drive shaft is mounted for reciprocation relative thereto but for rotation therewith.

3. The scroller jig saw of claim 2, wherein said locking control member is mounted on said scrolling control assembly.

4. The scroller jig saw of claim 2, wherein said lever is engageable with said scrolling control assembly in said locking position.

5. The scroller jig saw of claim 4, wherein said part has at least one notch therein in which said lever engages in said locking position.

6. The scroller jig saw of claim 5 wherein said part has a flange containing a plurality of such notches in which said lever is selectively engageable in said locking position.

7. The scroller jig saw of claim 1 wherein said locking control member has a resilient tongue releasably engageable in either of two spaced apart recesses in said housing to secure said locking control member in said scrolling and non-scrolling positions.

8. A scroller jig saw, comprising:
   a housing;
   a saw blade drive shaft mounted for reciprocating movement relative to said housing along a longitudinal axis and for rotation about said axis;
   a motor mounted in said housing and drivingly connected to said drive shaft for reciprocating said drive shaft along said axis;
   a scrolling control member accessible to an operator and coupled to said drive shaft for rotation thereof;
   locking means for releasably locking said drive shaft against rotation;
   said locking means comprising a pivotally mounted lever pivotal between a locking position in which said drive shaft is locked against rotation and a free position in which said drive shaft is free to rotate;
   said lever being resiliently biased towards said locking position;
   a locking control member accessible to the operator and movable between a scrolling position, in which said locking control member acts upon said lever to hold the latter in said free position, and a non-scrolling position in which said control member allows said lever to be biased into said locking position;
   a scrolling control assembly which includes and is rotatable by said scrolling control member, and further includes a part in which said drive shaft is mounted for reciprocation relative thereto but for rotation therewith; and
   said drive shaft having a circular cross-section and said part having a bore therein of a non-circular crosssection, said drive shaft being mounted for reciprocation in said bore but having at least one lateral projection which cooperates with said non-circular bore to prevent relative rotation between said drive shaft and said part.

9. The scroller jig saw of claim 8, wherein said scrolling control member comprises a manually graspable knob mounted through a top wall of said housing and having a plurality of legs which extend parallel to said axis and connectingly engage through apertures in a rotatable part of said locking means for rotation thereof, and said locking control member is rotatably mounted about said axis at a location between said rotatable part and said top wall;

10. A scroller jig saw, comprising:
    a housing;
    a saw blade drive shaft mounted for reciprocating movement relative to said housing along a longitudinal axis and for rotation about said axis;
    a motor mounted in said housing and drivingly connected to said drive shaft for reciprocating said drive shaft along said axis;
    a scrolling control member accessible to an operator and coupled to said drive shaft for rotation thereof;
    locking means for releasably locking said drive shaft against rotation;
    said locking means comprising a pivotally mounted lever pivotal between a locking position in which said drive shaft is locked against rotation and a free position in which said drive shaft is free to rotate;
    said lever being resiliently biased towards said locking position;
    a locking control member accessible to the operator and movable between a scrolling position, in which said locking control member acts upon said lever to hold the latter in said free position, and a non-scrolling position in which said control member allows said lever to be biased into said locking position; and
    said lever being pivotally mounted intermediate its ends, being resiliently biased by a compression spring acting on one of said ends, and being engageable by said locking control member at the other of said ends.

11. The scroller jig saw of claim 10, wherein said locking control member comprises a cam member rotatable about said axis and having a cam surface engageable with said lever.

12. The scroller jig saw of claim 11, wherein said locking control member includes at least one manually operable lug projecting through an opening in said housing.

13. The scroller jig saw of claim 10, wherein said lever has a portion, intermediate said other end and the pivotal mounting of said lever, which is engageable with a rotatable part of said locking means in said locking position.

14. A jig saw, comprising:
    a housing having a top and two sides;
    a saw blade drive shaft of circular cross-section mounted in spaced apart bearings in said housing for reciprocating movement along a longitudinal axis of said drive shaft and for rotation about said axis;
    a flanged block having a bore therethrough of non-circular cross-section, said block drive shaft engaging in said bore for reciprocating movement therein;
    a pin extending transversely through said drive shaft cooperating with said bore to prevent rotation of said drive shaft therein;
    a manually operable member rotatably mounted through the top of said housing and connected to said block for manual rotation thereof;
    a lever pivotally mounted in said housing adjacent said block, an end of said lever being spring biased to engage said flange to lock said block and said drive shaft against rotation;
    a ring-like member having a cam surface on one side thereof and being rotatably mounted on said manually operable member at a location inside said housing;
    said ring-like member being rotatable between a first position, in which cam surface engages said lever and pivots the lever out of engagement with said flange to enable said block and said drive shaft to be rotated, and a second position in which said cam surface allows said lever to be spring biased into engagement with said flange for locking said block and said drive shaft against rotation; and
    said ring-like member having diametrically opposed protrusions extending outwardly through openings in the two sides of the housing adjacent the top of said housing, said protrusions being manually accessible for rotation of said ring-like member between said first and second positions.

* * * * *